United States Patent
Wang et al.

(10) Patent No.: US 10,566,781 B2
(45) Date of Patent: Feb. 18, 2020

(54) INPUT/OUTPUT BUFFER CIRCUIT WITH A PROTECTION CIRCUIT

(71) Applicant: Nuvoton Technology Corporation, Hsinchu (TW)

(72) Inventors: Cheng-Chih Wang, Hsinchu (TW); Chai-Teck Gan, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 858 days.

(21) Appl. No.: 15/015,144

(22) Filed: Feb. 4, 2016

(65) Prior Publication Data

US 2016/0308346 A1  Oct. 20, 2016

(30) Foreign Application Priority Data

Apr. 20, 2015 (TW) .............................. 104112587 A

(51) Int. Cl.
*H02H 3/20* (2006.01)

(52) U.S. Cl.
CPC .................................. *H02H 3/202* (2013.01)

(58) Field of Classification Search
CPC . G01R 31/024; G06F 11/27; G09G 2330/025; G09G 2330/04; G11C 2207/2227; G11C 7/1078; G11C 7/1084; G11C 27/02; G11C 27/022; G11C 27/024; G11C 27/026; G11C 27/028; H01L 23/60; H01L 27/0248; H02H 3/006; H02H 3/07; H02H 3/14; H02H 3/20; H02H 3/202; H02H 3/207; H02H 3/22; H02H 3/24; H02H 3/243; H02H 3/26; H02H 3/265; H02H 3/28; H02H 3/32; H02H 3/325; H02H 3/332; H02H 3/353; H02H 3/36; H02H 3/38; H02H 3/382; H02H 3/40; H02H 7/09; H02H 7/1252; H02H 9/046; H02H 9/06; H02M 1/08; H02M 1/32; H02M 1/38; H03F 1/52; H03F 2200/331; H03F 2203/45592; H03F 3/217; H03K 17/0822; H03K 17/162; H03K 17/18; H03K 19/0016; H03K 19/00315; H03K 19/00361; H03K 19/17744; H03K 19/17772; H03K 19/1778; H03K 5/1515; H03K 5/24; H05K 1/0259; Y10T 307/858
(Continued)

(56) References Cited

U.S. PATENT DOCUMENTS 6,034,857 A * 3/2000 Sample ............ H03K 19/00315
                                                  361/93.2
6,259,588 B1   7/2001 Sample et al.
(Continued)

*Primary Examiner* — Thienvu V Tran
*Assistant Examiner* — Nicolas Bellido
(74) *Attorney, Agent, or Firm* — CKC & Partners Co., LLC

(57) ABSTRACT

An input/output (I/O) buffer circuit includes an I/O unit and a protection circuit. The I/O unit selectively receives and outputs signals based on an enable signal. The protection circuit generates a logic control signal to deactivate the I/O unit in a state where a voltage level of the I/O terminal is abnormal. The protection circuit includes a register. The register latches a logic signal corresponding to the voltage level of the I/O terminal in a state where the voltage level of the I/O terminal is abnormal, outputs the logic control signal based on the logic signal, and is preset to output the logic control signal based on the logic signal when a power-off state resumes to a power-on state.

4 Claims, 8 Drawing Sheets

(58) Field of Classification Search
USPC .............. 361/56, 79, 86, 88, 91.1, 101
See application file for complete search history.

(56) References Cited

U.S. PATENT DOCUMENTS

| | | | |
|---|---|---|---|
| 6,621,336 B1 | 9/2003 | Johnson | |
| 7,639,045 B2* | 12/2009 | Motamed | H03K 19/018592 |
| | | | 326/82 |
| 7,843,675 B2 | 11/2010 | Hirata | |
| 2002/0191438 A1* | 12/2002 | Shukuri | G11C 14/00 |
| | | | 365/185.05 |
| 2004/0064657 A1* | 4/2004 | Navada | G06F 9/30105 |
| | | | 711/156 |
| 2008/0043391 A1 | 2/2008 | Wong et al. | |
| 2013/0234760 A1* | 9/2013 | Wang | G11C 7/1057 |
| | | | 327/108 |
| 2014/0310533 A1* | 10/2014 | Shionoiri | G06F 1/00 |
| | | | 713/192 |
| 2016/0269030 A1* | 9/2016 | Wang | H03K 19/173 |

\* cited by examiner

INPUT/OUTPUT BUFFER CIRCUIT WITH A PROTECTION CIRCUIT

RELATED APPLICATIONS

This application claims priority to Taiwanese Application Serial Number 104112587, filed Apr. 20, 2015, which is herein incorporated by reference.

BACKGROUND

Technical Field

The present disclosure relates to a circuit. More particularly, the present disclosure relates to an input/output (I/O) circuit.

Description of Related Art

The current technology is such that integrated circuit (ICs) can be used to execute various different types of operations simultaneously. The capability of ICs may be enhanced by packaging more circuits in one chip or by integrating circuits with different purposes in one element. For example, a control chip may include digital circuits and analog circuits to process digital signals and analog signals, and to perform corresponding functions.

However, in a state where it is desired for the above-mentioned chip to process analog signals through an I/O terminal, if an abnormal condition (for example, an over-current condition) is encountered, effective protection of the above-mentioned I/O terminal is not possible, and moreover, it is not possible to know if any abnormal condition in the above-mentioned I/O terminal has occurred. Consequently, malfunctioning of the above-mentioned chip may occur during use.

SUMMARY

One embodiment of the present disclosure is related to an input/output (I/O) buffer circuit. The I/O buffer circuit comprises an I/O unit and a protection circuit. The I/O unit has an I/O terminal and is configured to selectively receive signals and output signals at the I/O terminal based on an enable signal. The protection circuit is configured to detect a voltage level of the I/O terminal, and generate a logic control signal to deactivate the I/O unit in a state where the voltage level of the I/O terminal is abnormal. The protection circuit comprises a register. The register is configured to latch at least one logic signal corresponding to the voltage level of the I/O terminal in the state where the voltage level of the I/O terminal is abnormal, to output the logic control signal based on the at least one logic signal, and be preset to output the logic control signal based on the logic signal when a power-off state resumes to a power-on state.

Another embodiment of the present disclosure is related to an I/O buffer circuit. The I/O buffer circuit comprises an I/O unit and a protection circuit. The I/O unit has an I/O terminal, a first output switch and a second output switch. The first output switch and the second output switch are coupled in a cascade configuration to the I/O terminal. The protection circuit is electrically coupled to the first output switch, the second output switch and the I/O terminal, and comprises a non-volatile register. The non-volatile register is configured to latch at least one logic signal corresponding to a voltage level of the I/O terminal and received before power is turned off, and be preset to output a logic control signal corresponding to the at least one logic signal when the power-off state resumes to the power-on state to selectively deactivate the first output switch and the second output switch based on the logic control signal.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
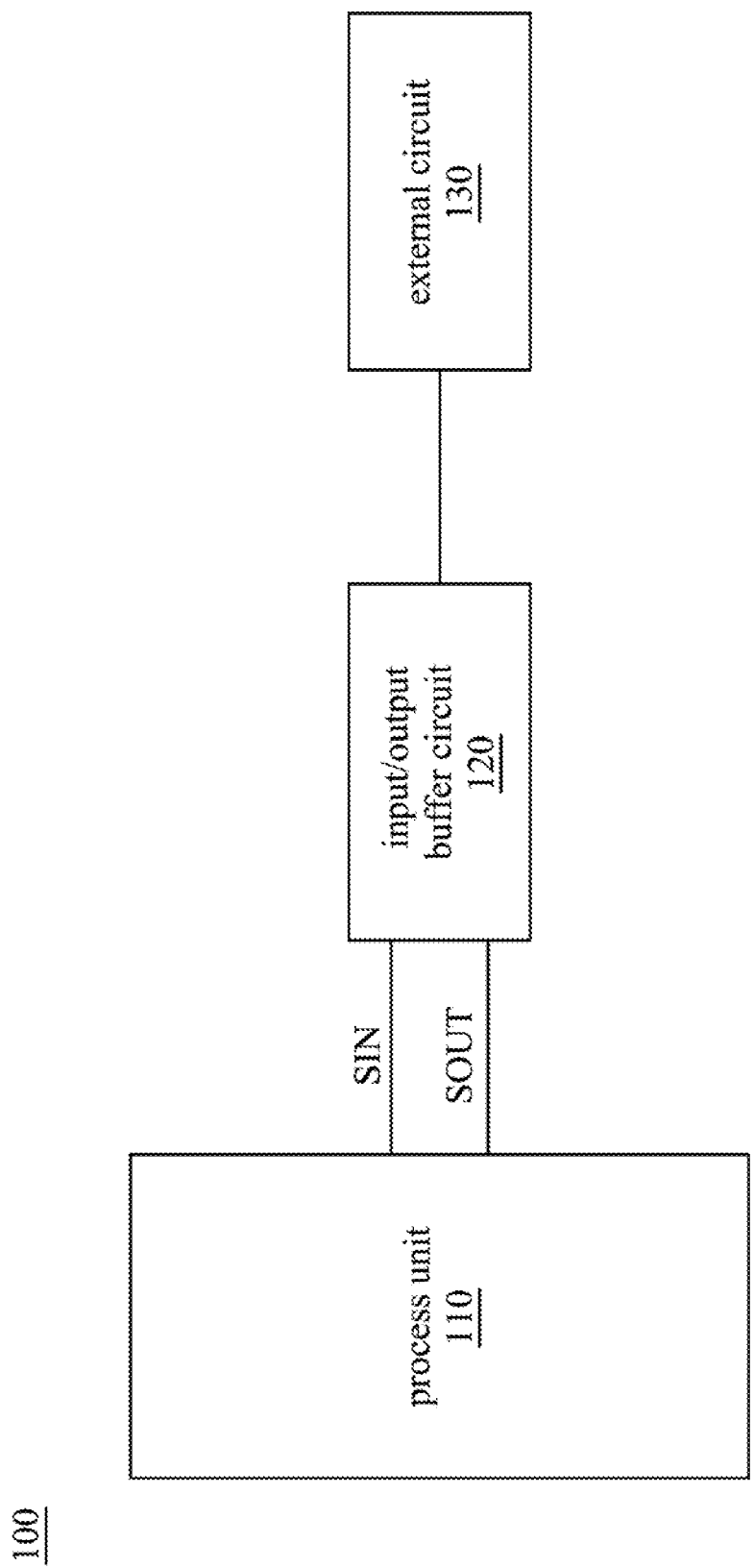
FIG. 1 is a block diagram illustrating a circuit system according to embodiments of the present disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

As used herein with respect to "first," "second," etc., these terms do no indicate a special order or have any type of special meaning, and instead are simply used to distinguish the operation described in the same terms or elements of it.

Secondly, the terms "comprise," "comprising," "include," "including," "has," "having," etc. used in this specification are open-ended and mean "comprises but not limited."

In addition, the term "coupled" may also be termed as "electrically coupled", and the term "connected" may be termed as "electrically connected". "Coupled" and "connected" may also be used to indicate that two or more elements cooperate or interact with each other.

FIG. 1 is a block diagram illustrating a circuit system according to embodiments of the present disclosure. As illustrated in FIG. 1, a circuit system 100 includes a process unit 110, an input/output (I/O) buffer circuit 120, and an external circuit 130. The I/O buffer circuit 120 is electrically coupled between the process unit 110 and the external circuit 130, and is configured to be a signal-transmitting link between the process unit 110 and the external circuit 130, such that the process unit 110 may receive an input signal SIN from the external circuit 130 through the I/O buffer circuit 120, or transmit an output signal SOUT to the external circuit 130 through the I/O buffer circuit 120.

In some embodiments, the process unit 110 may be a microprocessor, a central processing unit (CPU), a digital signal processor (DSP), an application-specific integrated circuit (ASIC), or a similar control or signal-processing element, or the combination thereof. In other embodiments, the external circuit 130 may be any circuit disposed outside the process unit 110 and which communicates with the process unit 110 to perform corresponding operations.

In various embodiments, an input/output pad (I/O pad) (not shown) may be disposed between the I/O buffer circuit 120 and the external circuit 130. The I/O buffer circuit 120 and the I/O pad may jointly set up the signal-transmitting link between the process unit 110 and the external circuit 130.

In addition, as illustrated in FIG. 1, the I/O buffer circuit 120 is disposed outside the process unit 110, but in other embodiments, the I/O buffer circuit 120 may be disposed in the same chip together with the process unit 110. The configuration of the I/O buffer circuit 120 is not limited to that illustrated in FIG. 1.

Figure 2:
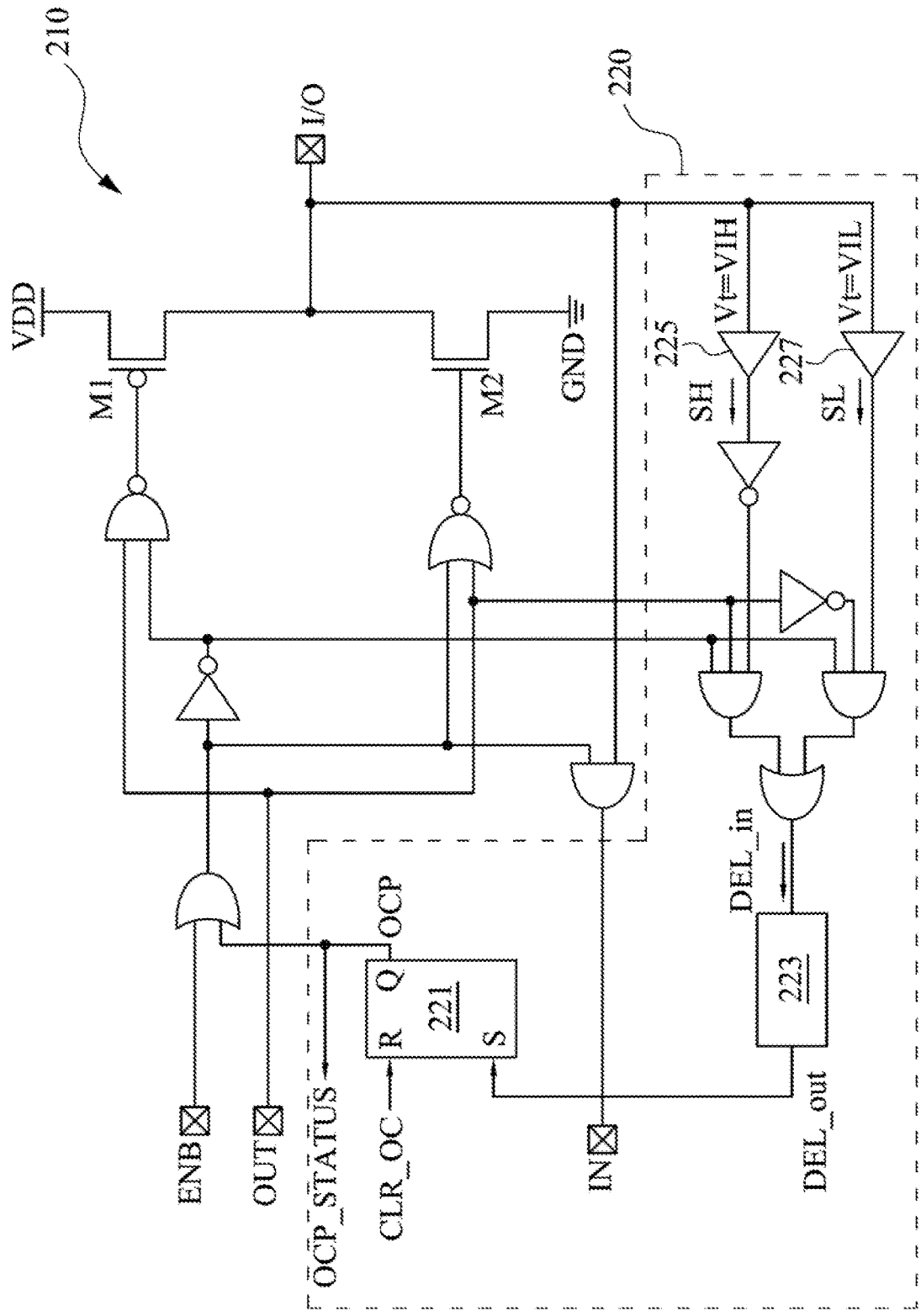
FIG. 2 is a schematic circuit diagram illustrating an I/O buffer circuit according to a first embodiment of this disclosure.

FIG. 2 is a schematic circuit diagram illustrating an I/O buffer circuit according to a first embodiment of this disclosure. The I/O buffer circuit 200 illustrated in FIG. 2 may be applied to the circuit system 100 illustrated in FIG. 1, but is not limited thereto. As illustrated in FIG. 2, I/O buffer circuit 200 may include an I/O unit 210 and a protection circuit 220.

The I/O unit 210 may have an I/O terminal I/O and is configured to selectively receive signals and output signals at the I/O terminal I/O based on an enable signal ENB. In other words, the enable signal ENB may be configured to determine whether the I/O terminal I/O receives signals or outputs signals. In a state where the enable signal ENB has, for example, a logic level 0, after the I/O unit 210 receives an output signal OUT, the I/O unit 210 may further output an output signal OUT at the I/O terminal I/O based on the enable signal ENB. The logic level of the output signal OUT may be determined by signals received on the output pad (such as, terminal OUT illustrated in FIG. 2). On the other hand, in a state where the enable signal ENB has, for example, a logic level 1, the I/O unit 210 may further deliver digital input signals received at the I/O terminal I/O to an input terminal IN based on the enable signal ENB. The logic level of the above-mentioned enable signals ENB corresponding to the operation of the I/O unit 210 is just an example, and should not limit this disclosure. In other words, a person having ordinary skill in the art could utilize the enable signals ENB with different logic levels to control the operation of the I/O unit 210, depending on actual requirements.

Secondly, the protection circuit 220 may be configured to detect the voltage level of the I/O terminal I/O, and to generate a logic control signal OCP in a state where a voltage level of the I/O terminal I/O is abnormal (for example, an abnormal voltage level resulting from overcurrent). In such a state where the voltage level of the I/O terminal I/O is abnormal, the logic control signal OCP may deactivate the I/O unit 210 to protect the I/O unit 210.

The above-mentioned protection circuit 220 includes a register 221. The register 221 may be configured to, for example, latch at least one logic signal (for example, logic signal DEL_out) corresponding to the voltage level of the I/O terminal I/O in a state where the logic level of the I/O terminal I/O is abnormal, and may output the logic control signal OCP based on the at least one logic signal (for example, logic signal DEL_out), and further may be preset to output the logic control signal OCP based on the at least one logic signal (for example, logic signal DEL_out) when the power-off state resumes to the power-on state (for example, the register 221 receives power to be in normal functioning). In some embodiments, the above-mentioned register 221 is a non-volatile register (NVR). In practice, the above-mentioned register 221 may be implemented by an RS flip-flop or another similar flip-flop or latch.

In some embodiments, as illustrated in FIG. 2, the I/O unit 210 may include output switches M1 and M2. The output switches M1 and M2 are coupled in a cascade configuration to the I/O terminal I/O. Moreover, the protection circuit 220 may be electrically coupled to the output switches M1, M2 and the I/O terminal I/O. The register 221 may be configured to latch at least one logic signal (for example, logic signal DEL_out) corresponding to the voltage level of the I/O terminal I/O and received before power is turned off (for example, the power supplied to the register 221 is stopped or accidently has an voltage drop resulting in power-off of the register 221), and may be preset to output the logic control signal OCP corresponding to the at least one logic signal when the register 220 is changed from the power-off state to the power-on state (for example, the register 220 receives power to be in normal functioning), to selectively deactivate the output switches M1 and M2 based on the logic control signal OCP. As a result, a protection operation may be performed in a state where the voltage level of the I/O terminal I/O is abnormal (for example, an abnormal voltage level resulting from overcurrent).

Consequently, the above-mentioned protection circuit 220 may perform effective protection for the I/O unit 210. Moreover, because the above-mentioned register 221 may latch the logic signal received before power is turned off and further may be preset to output the corresponding logic control signal OCP when the power-off state resumes to the power-on state, users may know if there has been any abnormal condition in the I/O unit 210 to thereby avoid the presence of a malfunction in the I/O buffer circuit 200.

In some embodiments, as illustrated in FIG. 2, the protection circuit 220 may further include two voltage-detecting elements 225 and 227. The voltage-detecting elements 225 and 227 separately have an input terminal electrically coupled with the I/O terminal I/O, and a threshold voltage of the voltage-detecting elements 225 and a threshold voltage of the voltage-detecting elements 227 are different. More particularly, the voltage-detecting element 225 may have a relatively high threshold voltage VIH (such as 2.0V), and the voltage-detecting element 227 may have a relatively low threshold voltage (such as 0.8V). In addition, the voltage-detecting element 225 may be configured to compare a voltage of the I/O terminal I/O with the threshold voltage VIH to output a logic signal SH corresponding to the voltage level of the I/O terminal I/O. The voltage-detecting element 227 may be configured to compare the voltage of the I/O terminal I/O with the threshold voltage VIL to output a logic signal SL corresponding to the voltage level of the I/O terminal I/O.

For example, when the digital output of the I/O terminal I/O has a logic level 1, the voltage of the I/O terminal I/O is higher than the threshold voltage VIH. When the digital output of the I/O terminal I/O has a logic level 0, the voltage of the I/O terminal I/O is lower than the threshold voltage VIL. Accordingly, if the voltage of the I/O terminal I/O does not match the above-mentioned condition (for example, when the digital output of the I/O terminal I/O has a logic level 1, the voltage of the I/O terminal I/O is lower than the threshold voltage VIH, or when the digital output of the I/O terminal I/O has a logic level 0, the voltage of the I/O terminal I/O is higher than the threshold voltage VIL), this indicates that the voltage level of the I/O terminal I/O is abnormal (for example, an abnormal voltage level resulting from overcurrent). At this time, the voltage-detecting element 225 outputs a corresponding logic signal SH or the voltage-detecting element 227 outputs a corresponding logic signal SL, such that the logic signal DEL-out is generated and transmitted to the register 221 to enable the register 221 to output the logic control signal OCP, and enable the register 221 to be preset to output the logic control signal OCP when the power-off state resumes to the power-on state, so as to determine whether any abnormal condition occurs and further to protect the chip from damage due to overcurrent.

On the other hand, in some embodiments, as illustrated in FIG. 2, the protection circuit 220 may further include a delay unit 223. The delay unit 223 may be configured to receive a logic signal DEL_in generated based on the voltage level of the I/O terminal I/O, and delay a predetermined time for the logic signal DEL_in to generate a logic signal DEL_out. Accordingly, it may make sure that the logic control signal OCP is correspondingly generated based on the voltage level of the I/O terminal I/O to filter out the interference of related noise and to exclude the mis-detection resulting from noise or from transient response.

It should be noted that the protection circuit 220 may further include other circuit elements which operate in coordination with the delay unit 223 and the voltage-detecting elements 225 and 227, as illustrated in FIG. 2, a description of which will not be provided here again.

Figure 3A:
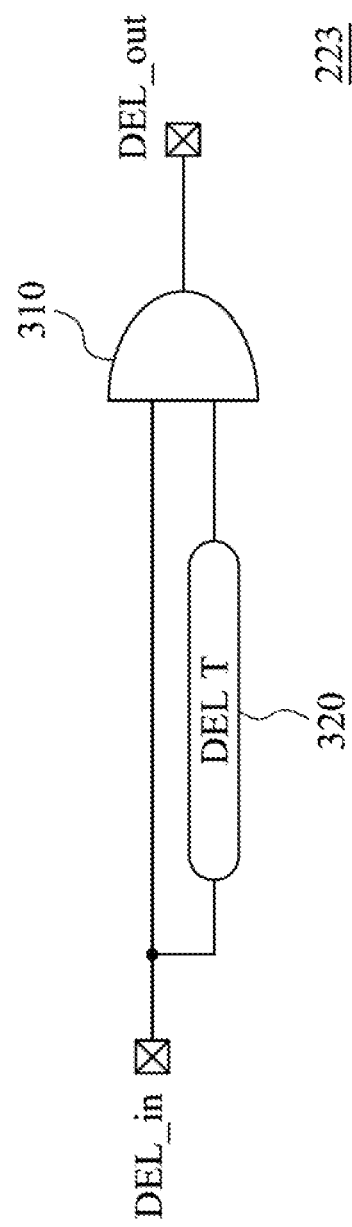
FIG. 3A is a schematic diagram illustrating a delay unit as illustrated in FIG. 2 according to embodiments of this disclosure.
Figure 3B:
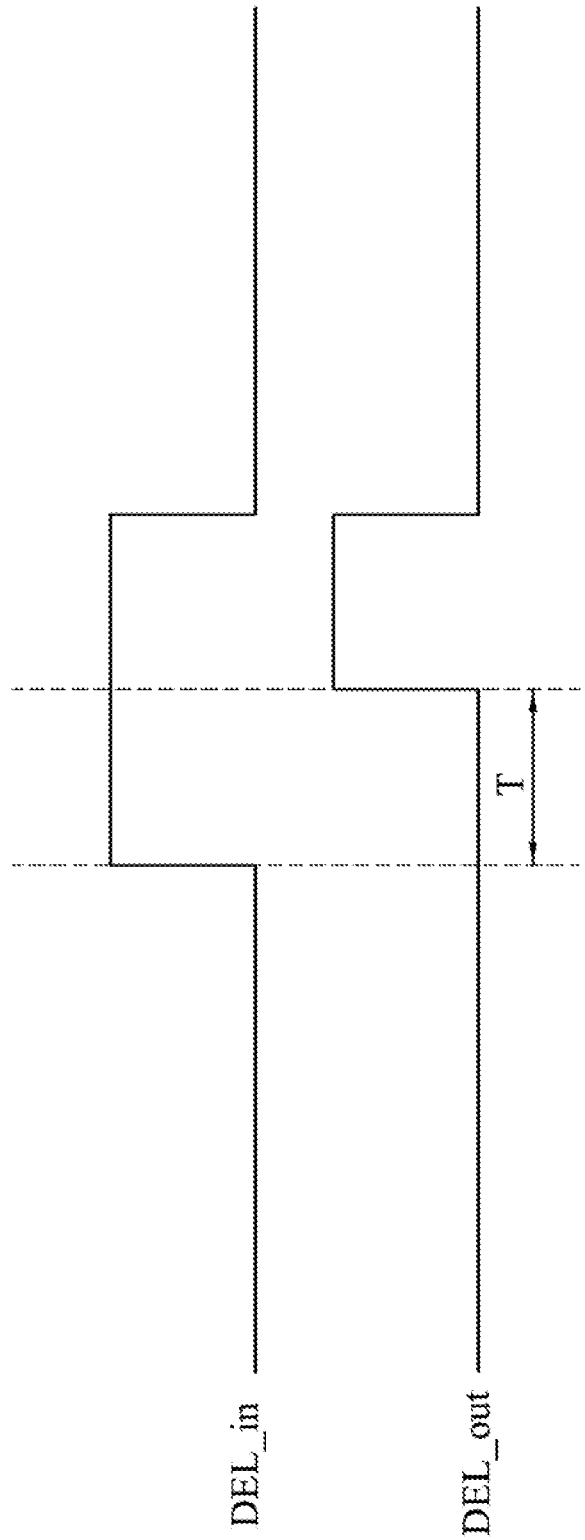
FIG. 3B is a schematic diagram illustrating an input signal and an output signal of the delay unit as illustrated in FIG. 3A according to embodiments of this disclosure.

FIG. 3A is a schematic diagram illustrating the delay unit as illustrated in FIG. 2 according to embodiments of this disclosure. FIG. 3B is a schematic diagram illustrating the input signal and the output signal of the delay unit as illustrated in FIG. 3A according to embodiments of this disclosure. As illustrated in FIG. 3A and FIG. 3B, the delay unit 223 includes an AND gate 310 and a delay element 320. The delay element 320 is configured to delay a period of time T for the logic signal DEL_in. The AND gate 310 is configured to execute an AND logic operation for the inputted logic signal DEL_in and the output of the delay unit 320, and to output a corresponding logic signal DEL_out.

It should be noted that the delay unit 223 illustrated in FIG. 2 is not limited to the embodiment illustrated in FIG. 3A. A person having ordinary skill in the art may implement the delay unit 223 in different ways, depending on actual requirements.

Figure 4:
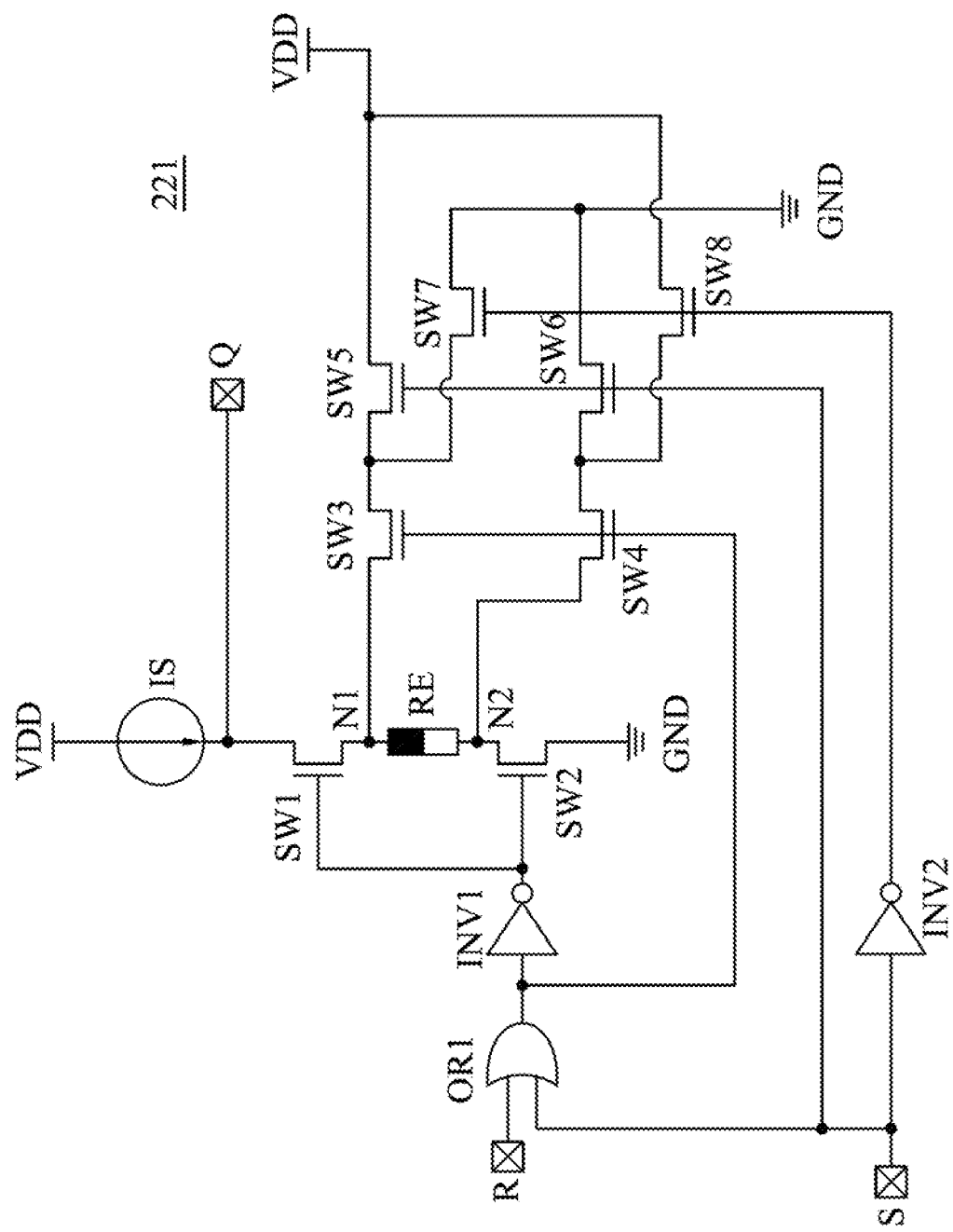
FIG. 4 is a schematic circuit diagram illustrating a register as illustrated in FIG. 2 according to embodiments of this disclosure.

FIG. 4 is a schematic circuit diagram illustrating the register illustrated in FIG. 2 according to embodiments of this disclosure. As illustrated in FIG. 4, the register 221 includes a current source IS, switches SW1~SW8, inverters INV1, INV2, an OR gate OR1 and a resistive random access memory element RE.

A first terminal of the switch SW1 is electrically coupled with the current source IS and a register output terminal Q. A first terminal (for example, node N1) of the resistive random access memory element RE is electrically coupled with a second terminal of the switch SW1. A first terminal of the switch SW2 is electrically coupled with a second terminal (for example, node N2) of the resistive random access memory element RE. An output terminal of the inverter INV1 is electrically coupled with control terminals of the switches SW1 and SW2. An output terminal of the OR gate OR1 is electrically coupled with an input terminal of the inverter INV1, a first input terminal of the OR gate OR1 is electrically coupled with a register control terminal R, and a second input terminal of the OR gate OR1 is electrically coupled with a register input terminal S. A first terminal of the switch SW3 is electrically coupled with the first terminal (for example, node N1) of the resistive random access memory element RE, a first terminal of the switch SW4 is electrically coupled with the second terminal (for example, node N2) of the resistive random access memory element RE, and control terminals of the switches SW3 and SW4 are electrically coupled with the output terminal of the OR gate OR1. A first terminal of the switch SW5 is electrically coupled with a second terminal of the switch SW3, a second terminal of the switch SW5 is configured to receive a power voltage VDD, and a control terminal of the switch SW5 is electrically coupled with a register input terminal S. A first terminal of the switch SW6 is electrically coupled with a second terminal of the switch SW4, a second terminal of the switch SW6 is configured to receive a reference voltage GND (for example, a grounding voltage), and a control terminal of the switch SW6 is electrically coupled with the register input terminal S. A first terminal of the switch SW7 is electrically coupled with the second terminal of the switch SW3, and a second terminal of the switch SW7 is configured to receive the reference voltage GND. The first terminal of the switch SW8 is electrically coupled with the second terminal of the switch SW4, and a second terminal of the switch SW8 is configured to receive the power voltage VDD. An output terminal of the inverter INV2 is electrically coupled with the control terminals of the switches SW7 and SW8, and an input terminal of the inverter INV2 is electrically coupled with the register input terminal S.

In operation, when a signal with a logic signal 1 is transmitted to the register control terminal R, in a state where an operation signal (for example, signal DEL_out) received at the register input terminal S has logic level 1 or 0, the output terminal of the OR gate OR1 has a logic level 1, the output terminal of the inverter INV1 has a logic level 0, the switches SW1, SW2 are turned off, and the switches SW3, SW4 are turned on. When a signal with a logic signal 1 (for example, signal DEL_out) is transmitted to the register input terminal S, the output terminal of the inverter INV2 has a logic level 0, the switches SW7, SW8 are turned off, and the switches SW5. SW6 are turned on, such that the first terminal (for example, node N1) of the resistive random access memory element RE receives the power voltage VDD and the second terminal (for example, node N2) of the resistive random access memory element RE receives the reference voltage GND. At the same time, the resistive random access memory element RE may have a relatively high resistive state, which corresponds to logic level 1. That is, the resistive random access memory element RE temporarily stores a signal corresponding to logic level 1.

On the other hand, in a state where the switches SW3 and SW4 are turned on, when the signal with a logic level 0 (for example, signal DEL_out) is transmitted to register input terminal S, the output terminal of the inverter INV2 has a logic level 1, the switches SW7, SW8 are turned on, and the switches SW5, SW6 are turned off, such that the first terminal (for example, node N1) of the resistive random access memory element RE receives the reference voltage GND and the second terminal (for example, node N2) of the resistive random access memory element RE receives the power voltage VDD. At the same time, the resistive random access memory element RE may have a relatively low resistive state, which corresponds to logic level 0. That is, the resistive random access memory element RE temporarily stores a signal corresponding to logic level 0.

It should be noted that the register illustrated in FIG. 4 is an example, but it is not used to limit this disclosure. A person having ordinary skill in the art may make various modifications without departing from the scope or spirit of the disclosure. For example, in some embodiments, the switches SW1~SW8 illustrated in FIG. 4 may be implemented by NMOS. In other embodiments, the switches SW1~SW8 illustrated in FIG. 4 may be implemented by PMOS, and other elements may be adjusted correspondingly.

In addition, when a signal with a logic level 1 is transmitted to the register control terminal R, the output terminal of the inverter INV1 has a logic level 0, the switches SW1, SW2 are turned off, and the register output terminal Q outputs a signal corresponding to the power voltage VDD. On the other hand, when a signal with a logic level 0 is transmitted to the register control terminal R and the register input terminal S has the logic level 0, the output terminal of the inverter INV1 has a logic level 1, and the switches SW1, SW2 are turned on. At the same time, the signal having a logic level 0 or 1 temporarily stored in the resistive random access memory element RE is outputted through the register output terminal Q.

As mentioned above, when power is turned off, the register 221 illustrated in FIG. 4 may be configured to temporarily store or latch the operation signal (for example, signal DEL_out) corresponding to the last operation stage and received by the register input terminal S. Moreover, when the register 220 is changed from the power-off state to the power-on state, in a state where the signal with a logic level 0 is transmitted to the register control terminal R and the operation signal (for example, signal DEL_out) received at the register input terminal S has a logic level 0, the signal stored temporarily in the resistive random access memory element RE may be outputted through the register output terminal Q, such that the register 221 may immediately output the logic control signal OCP corresponding to the last operation stage and the I/O unit may immediately extend the signal processing of the last operation stage. Moreover, the user may know whether any abnormal condition has been encountered in the I/O unit 210, and the I/O unit 210 may be directly controlled by the logic control signal OCP corresponding to the last operation stage, or may be directly deactivated so as to be protected and thereby avoid the presence of any malfunction in the I/O buffer circuit 200.

Figure 5:
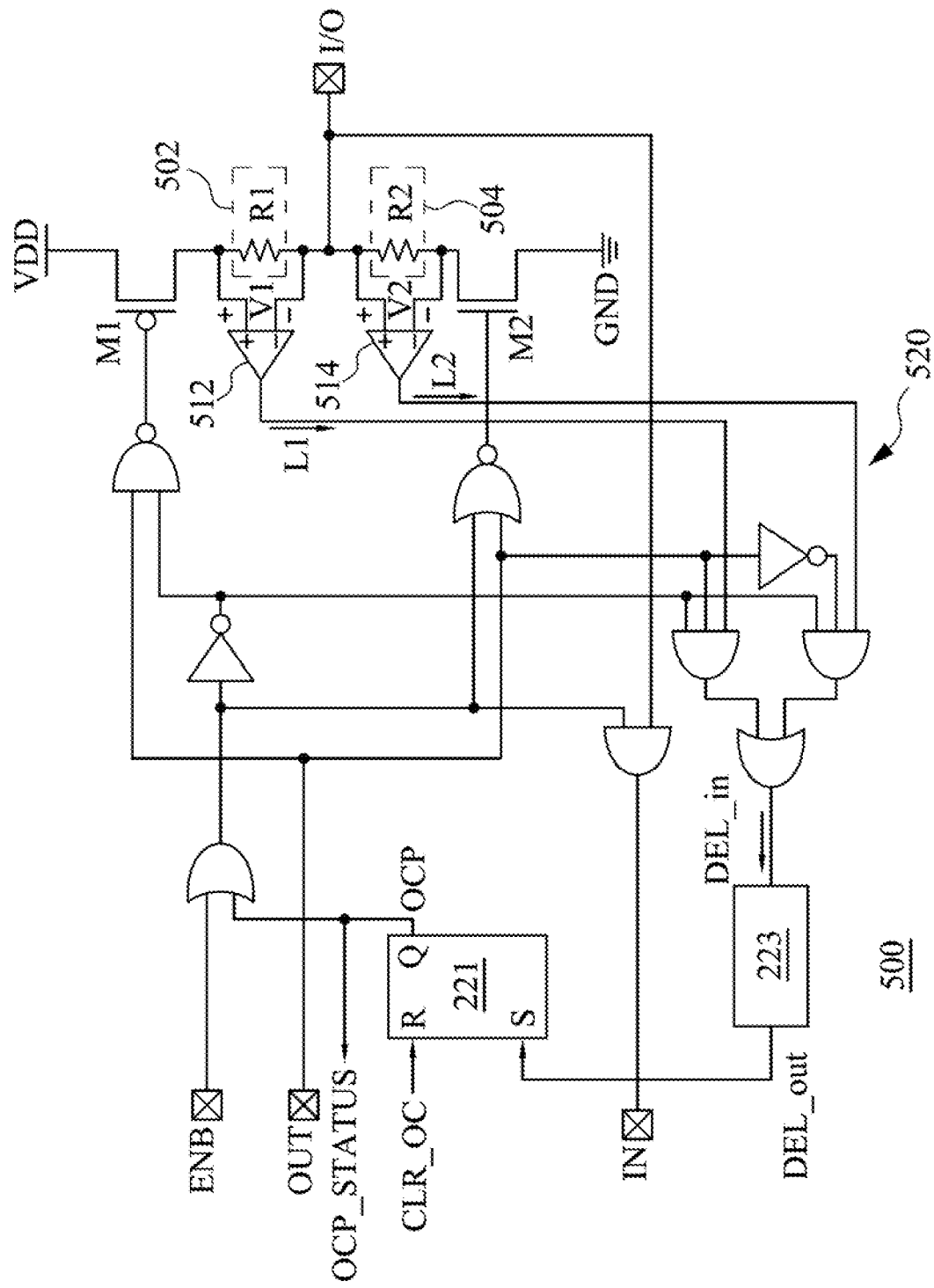
FIG. 5 is a schematic circuit diagram illustrating an I/O buffer circuit according to a second embodiment of this disclosure.

FIG. 5 is a schematic circuit diagram illustrating an I/O buffer circuit according to a second embodiment of this disclosure. The I/O buffer circuit 500 illustrated in FIG. 5 may be applied to the circuit system 100 as illustrated in FIG. 1, but is not limit thereto.

Compared to the embodiment illustrated in FIG. 2, in the I/O buffer circuit 500 illustrated in FIG. 5, the protection circuit 520 may include resistor units 502, 504 and detection elements 512 and 514. The resistor unit 502 is electrically coupled between the output switch M1 and the I/O terminal I/O, and may be configured to output a detection voltage V1 corresponding to an operation current flowing through the I/O terminal I/O. The resistor unit 504 is electrically coupled between the output switch M2 and the I/O terminal I/O, and may be configured to generate a detection voltage V2 corresponding to the operation current flowing through the I/O terminal I/O. The detection element 512 includes two input terminals which are separately coupled with two terminals of the resistor unit 502. The detection element 512 is configured to receive the detection voltage V1, and generate a logic signal L1 based on the detection voltage V1. The detection element 514 includes two input terminals which are separately coupled with two terminals of the resistor unit 504. The detection element 514 is configured to receive the detection voltage V2 and generate a logic signal L2 based on the detection voltage V2. Accordingly, the logic signal DEL_in may be generated by a corresponding logic circuit based on the logic signals L1 and L2, and the delay unit 223 generates a corresponding logic signal DEL_out based on the logic signal DEL_in, such that the register 221 outputs the logic control signal OCP based on the logic control signal DEL_out.

Figure 6:
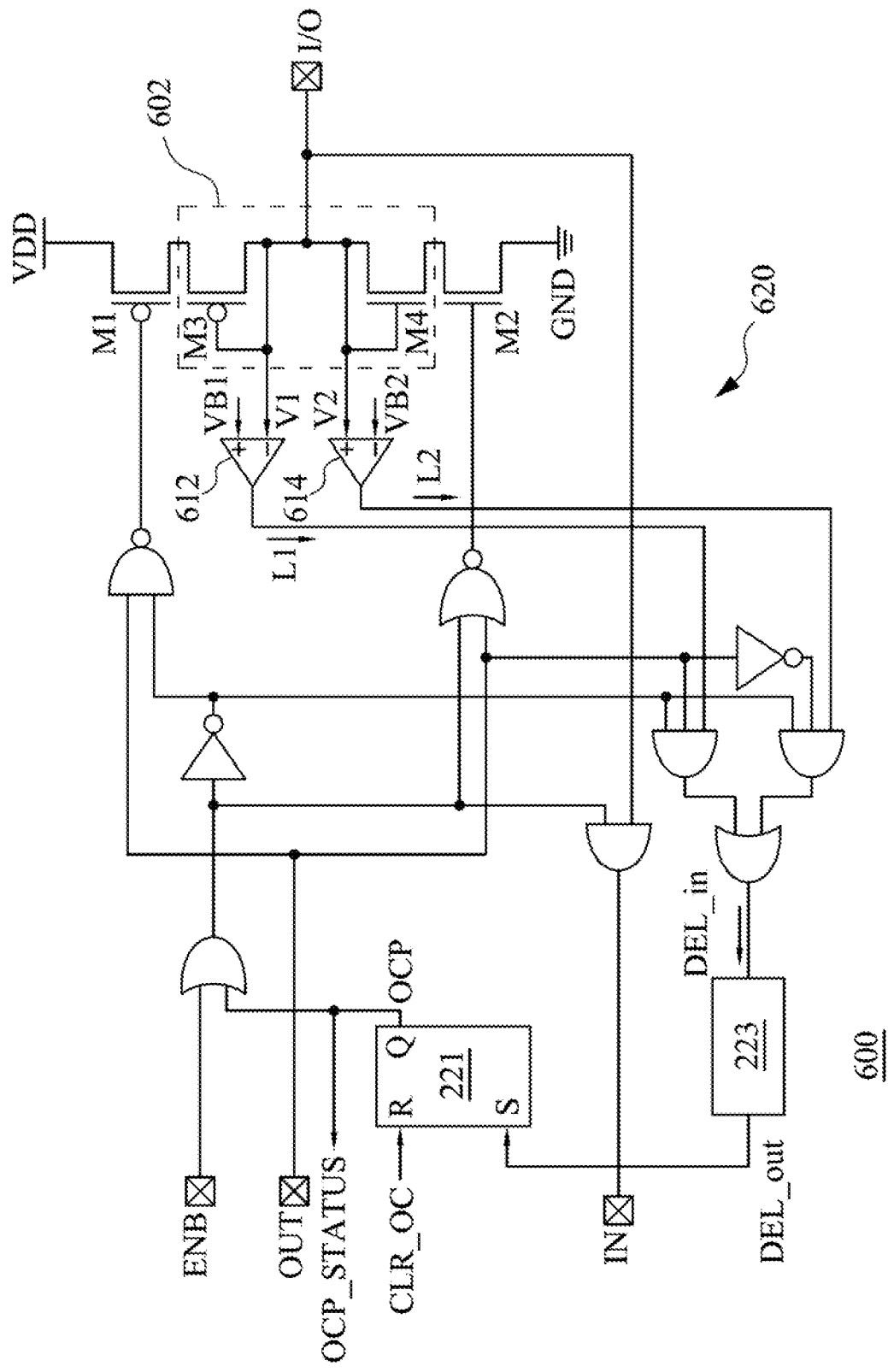
FIG. 6 is a schematic circuit diagram illustrating an I/O buffer circuit according to a third embodiment of this disclosure.

FIG. 6 is a schematic circuit diagram illustrating an I/O buffer circuit according to a third embodiment of this disclosure. The I/O buffer circuit 600 illustrated in FIG. 6 may be applied to the circuit system 100 as illustrated in FIG. 1, but is not limited thereto.

Compared to the embodiment illustrated in FIG. 5, in the I/O buffer circuit 600 illustrated in FIG. 6, a protection circuit 600 may include a switch unit 602 and the detection elements 612 and 614. The switch unit 602 is configured to generate a detection voltage V1 or V2 corresponding to the operation current flowing through the I/O terminal I/O based on the voltage of the I/O terminal I/O. The detection element 612 is configured to compare the detection voltage V1 with a default voltage VB1 to generate a logic signal L1. The detection element 614 is configured to compare the detection voltage V2 with a default voltage VB2 to generate a logic signal L2. Accordingly, the logic signal DEL_in may be generated by a corresponding logic circuit based on the logic signals L1 and L2, and the delay element 223 generates the logic signal DEL_out based on the corresponding logic signal DEL_in, such that the register 221 outputs the logic control signal OCP based on the logic signal DEL_out.

In some embodiments, the switch unit 602 may include detection switches M3 and M4. The detection switch M3 is coupled in a cascade configuration with the output switch M1, and one terminal of the detection switch M3 and a control terminal of the detection switch M3 are electrically coupled to the I/O terminal I/O. The detection switch M4 is coupled in a cascade configuration with the output switch M2, and one terminal of the detection switch M4 and a control terminal of the detection switch M4 are electrically coupled to the I/O terminal I/O. The detection element 612 includes a first input terminal and a second input terminal.

The first input terminal is configured to receive the default voltage VB1, and the second input terminal is electrically coupled with the control terminal of the detection switch M3. The detection element 614 includes a first input terminal and a second input terminal. The first input terminal is configured to receive the default voltage VB2, and the second input terminal is electrically coupled with the control terminal of the detection switch M4.

In operation, when the output signal OUT has, for example, a logic level 1, the detection switch M3 is turned on, such that the detection voltage V1 is generated based on the operation current flowing through the I/O terminal I/O. When the output signal OUT has, for example, a logic level 0, the detection switch M4 is turned on, such that the detection voltage V2 is generated based on the operation current flowing through the I/O terminal I/O. In practice, the detection voltage V1 and the detection voltage V2 may be the same or different based on the configuration of the detection switches M3 and M4.

Accordingly, the logic signal DEL_in may be generated by a corresponding logic circuit based on the logic signals L1 and L2, and the delay element 223 generates the corresponding logic signal DEL_out based on the logic signal DEL_in, such that the register 221 outputs the logic control signal OCP based on the logic signal DEL_out.

Figure 7:
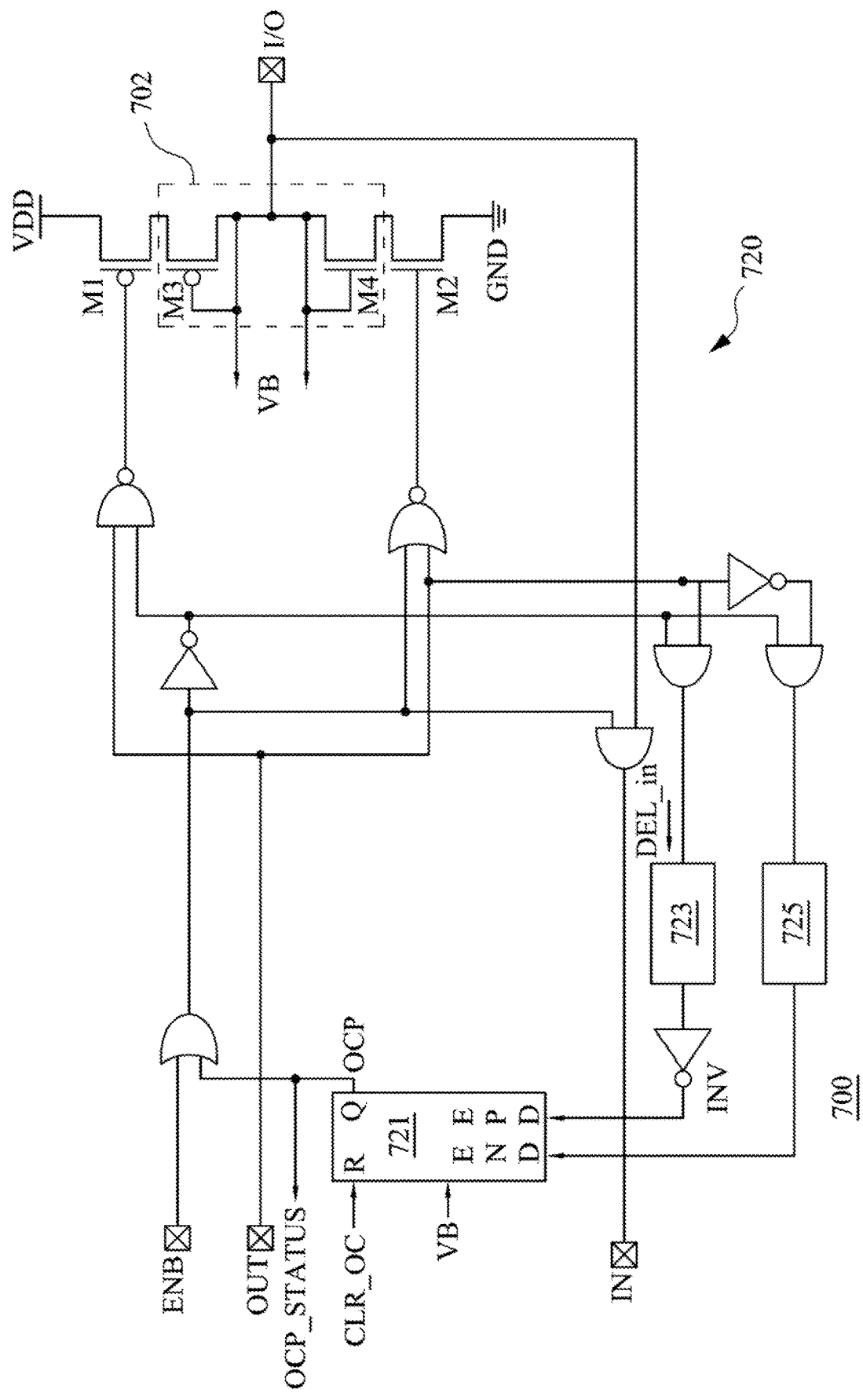
FIG. 7 is a schematic circuit diagram illustrating an I/O buffer circuit according to a fourth embodiment of this disclosure.

FIG. 7 is a schematic circuit diagram illustrating an I/O buffer circuit according to a fourth embodiment of this disclosure. The I/O buffer circuit 700 illustrated in FIG. 7 may be applied to the circuit system 100 as illustrated in FIG. 1, but is not limited thereto.

Compared to the embodiment illustrated in FIG. 6, in an I/O buffer circuit 700 illustrated in FIG. 7, the protection circuit 720 includes a switch unit 702. The switch unit 702 may be configured to generate a corresponding detection voltage VB based on the operation current flowing through the I/O terminal I/O, and the detection voltage VB may be transmitted to a register 721, such that the register 721 may perform operations based on the detection voltage VB and logic signals received at logic input terminals EPD and END of the register 721 to output the logic control signal OCP.

In some embodiments, the switch unit 702 may include detection switches M3 and M4. The detection switch M3 is coupled in a cascade configuration with an output switch M1, and one terminal of the detection switch M3 and a control terminal of the detection switch M3 are electrically coupled to the I/O terminal I/O. The detection switch M4 is coupled in a cascade configuration with an output switch M2, and one terminal of the detection switch M4 and a control terminal of the detection switch M4 are electrically coupled to the I/O terminal I/O. In operation, when an output signal OUT has, for example, a logic level 1, the detection switch M3 is turned on, such that the detection voltage VB is generated based on the operation current flowing through the I/O terminal I/O. When an output signal OUT has, for example, a logic level 0, the detection switch M4 is turned on, such that the detection voltage VB is generated based on the operation current flowing through the I/O terminal I/O.

In addition, the protection circuit 720 may include delay units 723 and 725. The delay unit 723 is electrically coupled with the logic input terminal EPD of the register 721 through an inverter INV, and the delay unit 725 is electrically coupled with the logic input terminal END of the register 721. The functions and operations of the delay units 723 and 725 are similar to the delay unit 223 illustrated in FIG. 2, and so will not be described here again.

Figure 8:
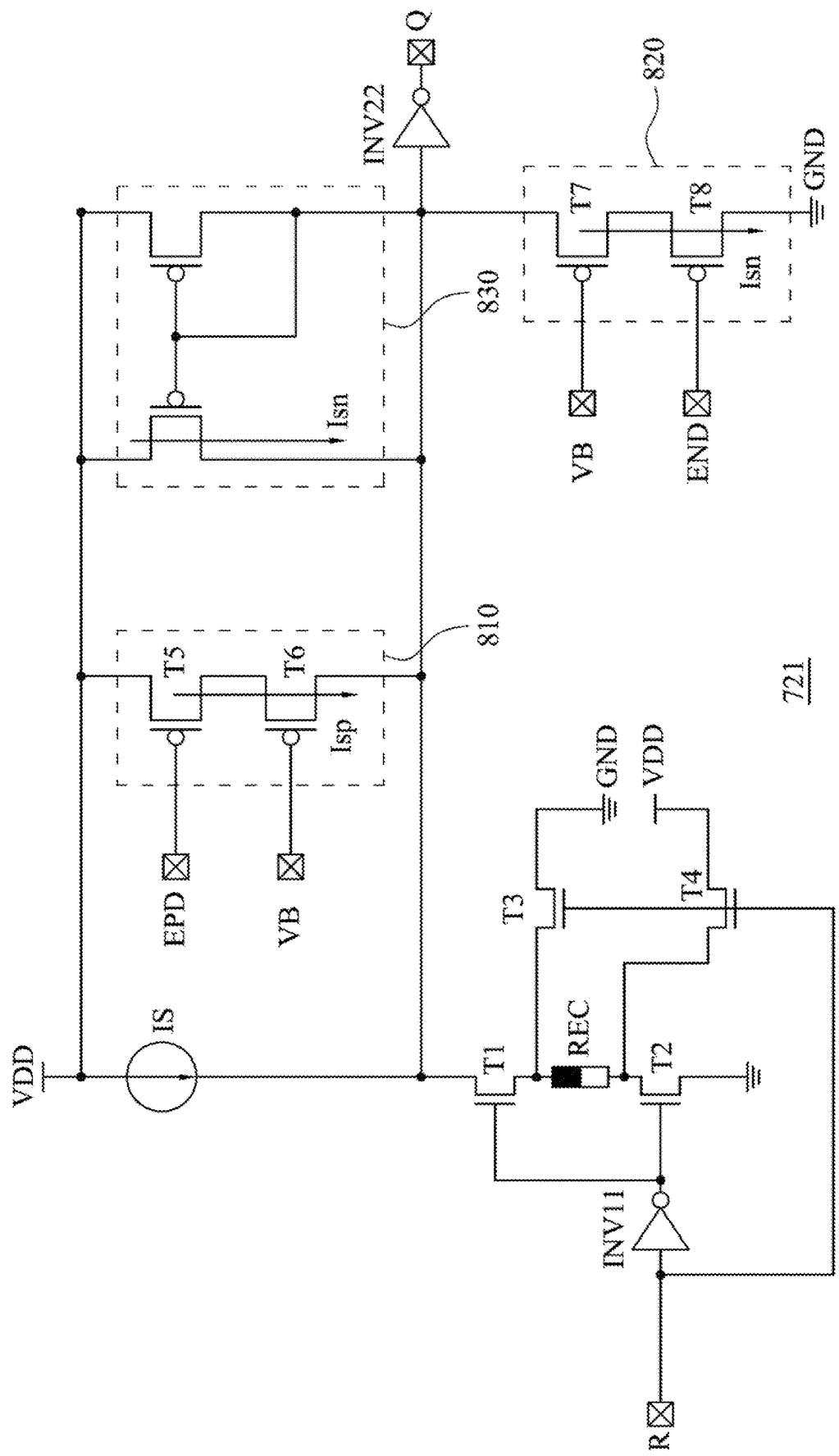
FIG. 8 is a schematic circuit diagram illustrating a register as illustrated in FIG. 7 according to embodiments of this disclosure.

FIG. 8 is a schematic circuit diagram illustrating the register as illustrated in FIG. 7 according to embodiments of this disclosure. As illustrated in FIG. 8, the register 721 includes current-detecting units 810, 820 and a resistive random access memory element REC. The current-detecting unit 810 may be configured to be controlled by the detection voltage VB and a logic signal received at the logic input terminal EPD to detect a first overcurrent event, and further to generate a current Isp when the first overcurrent event occurs. The current-detecting unit 820 may be configured to be controlled by the detection voltage VB and a logic signal received at the logic input terminal END to detect a second overcurrent event, and to generate a current Isn when the second overcurrent event occurs. The resistive random access memory element REC may be configured to store a corresponding detection logic level based on one of the currents Isp and Isn, such that the register 721 may output a control logic signal OCP at a register output terminal Q based on the detection logic level and be preset to output the logic control signal OCP when the register 721 is changed from power-off state to the power-on state.

In some embodiments, the current-detecting unit 810 includes switches T5 and T6. The switches T5 and T6 are coupled in a cascade configuration and coupled in parallel with a current source IS. The switch T5 is controlled by a logic signal received at a logic input terminal EPD, and the switch T6 is controlled by the detection voltage VB. In addition, the current-detecting unit 820 includes switches T7 and T8. The switches T7 and T8 are coupled in a cascade configuration. The switch T7 is controlled by the detection voltage VB, and the switch T8 is controlled by the logic signal received at the logic input terminal END.

Secondly, in some embodiments, as illustrated in FIG. 8, the register 721 further includes a current source IS, switches T1~T4, inverters INV11 and INV22 and a current mirror unit 830.

A first terminal of the switch T1 is electrically coupled with the current source IS. A first terminal of the resistive random access memory element REC is electrically coupled with a second terminal of the switch T1. A first terminal of the switch T2 is electrically coupled with a second terminal of the resistive random access memory element REC. An output terminal of the inverter INV11 is electrically coupled with control terminals of the switches T1 and T2, and an input terminal of the inverter INV11 is electrically coupled with a register control terminal R. A first terminal of the switch T3 is electrically coupled with the first terminal of the resistive random access memory element REC, a second terminal of the switch T3 is electrically coupled with a reference voltage GND (for example, a grounding voltage), and a control terminal of the switch T3 is electrically coupled with the register control terminal R. A first terminal of the switch T4 is electrically coupled with the second terminal of the resistive random access memory element REC, a second terminal of the switch T4 is electrically coupled with a voltage source VDD, and a control terminal of the switch T4 is electrically coupled with the register control terminal R. The current mirror unit 830 and the current source IS are coupled in parallel and coupled with one terminal of the switch T7. An output terminal of the inverter INV22 is electrically coupled with a register output terminal Q that may be configured to output the logic control signal OCP, and the input terminal of the inverter INV22 is electrically coupled with the first terminal of the switch T1.

In operation, as illustrated in FIGS. 7 and 8, in a state where an output signal OUT preset to be outputted at the I/O terminal I/O has a logic level 1, when the voltage level of the I/O terminal I/O is abnormal (for example, an abnormal voltage level resulting from overcurrent), the detection voltage VB correspondingly falls, such that the current Isp correspondingly rises (for example, larger than 200 uA). At the same time, the current Isp flows into the resistive random access memory element REC via the switch T1, such that the resistive random access memory element REC stores a corresponding logic level (for example, logic level 0). Next, the inverter INV22 may output the corresponding logic control signal OCP (for example, with a logic level 1) at the register output terminal Q based on the logic level stored in the resistive random access memory element REC.

On the other hand, in a state where the output signal OUT preset to be outputted at the I/O terminal I/O has a logic level 0, when the voltage level of the I/O terminal I/O is abnormal (for example, an abnormal voltage level resulting from overcurrent), the detection voltage VB correspondingly rises, such that the current Isn correspondingly rises (for example, larger than 200 uA). At the same time, such an operation may make the current Isn be generated in the current mirror unit 830 through the current mirror unit 830 and make the current Isn flow into the resistive random access memory element REC, such that the resistive random access memory element REC stores a corresponding logic level (for example, logic level 0). Next, the inverter INV22 may further output the corresponding logic control signal OCP (for example, with a logic level 1) at the register output terminal Q based on the logic level stored in the resistive random access memory element REC.

Consequently, the register 721 may output the logic control signal OCP based on the detection voltage VB and logic signals received at the logic input terminals EPD and END when the voltage level of the I/O terminal I/O is abnormal (for example, an abnormal voltage level resulting from overcurrent), and may be preset to output the logic control signal OCP when the register 721 is changed from the power-off state to the power-on state, so as to protect the I/O buffer circuit 700.

It should be noted that the above-mentioned embodiments illustrated in FIGS. 2, 5, 6 and 7 may be disposed independently or jointly. For example, a protection circuit may include the voltage-detecting elements 225, 227 illustrated in FIG. 2 and the resistor units 502, 504 illustrated in FIG. 5 and the detection elements 512, 514 at the same time. Therefore, the above-mentioned embodiments illustrated in FIGS. 2, 5, 6 and 7 are just examples, and should not be used to limit this disclosure.

As is evident from the above embodiments of this disclosure, the I/O buffer circuit applied above is able to protect an I/O unit by the above-mentioned register which latches a logic signal received before power is turned off and outputs a corresponding logic control signal, The above-mentioned register is able to be preset to output a corresponding logic control signal when the register is changed from power-off state to the power-on state at the same time. Consequently, a user is able to know whether there has been any abnormal condition in the I/O unit so as to avoid the presence of any malfunction in the I/O buffer circuit.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present disclosure cover modifications and variations of this disclosure provided they fall within the scope of the following claims.

What is claimed is:

1. An input/output (I/O) buffer circuit comprising:
   an I/O unit comprising an I/O terminal, a first output switch and a second output switch, wherein the first output switch and the second output switch are coupled in a cascade configuration to the I/O terminal, and wherein the I/O unit is configured to selectively receive signals and output signals at the I/O terminal based on an enable signal, wherein when the enable signal has a first logical level, the I/O unit outputs signals at the I/O terminal, and when the enable signal has a second logical level, the I/O unit receives signals at the I/O terminal; and
   a protection circuit electrically coupled to the first output switch, the second output switch and the I/O terminal, comprising:
      a non-volatile register configured to latch at least one logic signal corresponding to a voltage level of the I/O terminal and received before power is turned off, and be preset to output a logic control signal corresponding to the at least one logic signal when a power-off state resumes to a power-on state, to selectively deactivate the first output switch and the second output switch based on the logic control signal, wherein the non-volatile register comprises:
         a current source;
         a first switch, wherein a first terminal of the first switch electrically couples the current source to a register output terminal;
         a resistive random access memory element, wherein a first terminal of the resistive random access memory element is electrically coupled with a second terminal of the first switch;
         a second switch, wherein a first terminal of the second switch is electrically coupled with a second terminal of the resistive random access memory element;
         a first inverter, wherein an output terminal of the first inverter is electrically coupled with control terminals of the first switch and the second switch;
         an OR gate, wherein an output terminal of the OR gate is electrically coupled with the output terminal of the first inverter, wherein a first terminal of the OR gate is electrically coupled with a register control terminal, and a second terminal of the OR gate is electrically coupled with a register input terminal;
         a third switch, wherein a first terminal of the third switch is electrically coupled with the first terminal of the resistive random access memory element, and the control terminal of the third switch is electrically coupled with the output terminal of the OR gate;
         a fourth switch, wherein the first terminal of the fourth switch is electrically coupled with the second terminal of the resistive random access memory element, and the control terminal of the fourth switch is electrically coupled with the output terminal of the OR gate;
         a fifth switch, wherein the first terminal of the fifth switch is electrically coupled with a second terminal of the third switch, a second terminal of the fifth switch is configured to receive a power voltage, and a control terminal of the fifth switch is electrically coupled with the register input terminal;

a sixth switch, wherein the first terminal of the sixth switch is electrically coupled with a second terminal of the fourth switch, a second terminal of the sixth switch is configured to receive a reference voltage, and the control terminal of the sixth switch is electrically coupled with the register input terminal;

a seventh switch, wherein a first terminal of the seventh switch is electrically coupled with the second terminal of the third switch, and a second terminal of the seventh switch is configured to receive the reference voltage;

an eighth switch, wherein the first terminal of the eighth switch is electrically coupled with the second terminal of the fourth switch, and a second terminal of the eighth switch is configured to receive the power voltage; and a second inverter, wherein an output terminal of the second inverter is electrically coupled with control terminals of the seventh switch and the eighth switch, and an input terminal of the second inverter is electrically coupled with the register input terminal.

2. The I/O buffer circuit of claim 1, wherein the protection circuit further comprises a first voltage-detecting element and a second voltage-detecting element, and each of the first voltage-detecting element and the second voltage-detecting element separately has an input terminal electrically coupled with the I/O terminal, wherein a threshold voltage of the first voltage-detecting element is different from a threshold voltage of the second voltage-detecting element.

3. The I/O buffer circuit of claim 1, wherein the nonvolatile register comprises a resistive random access memory element.

4. The I/O buffer circuit of claim 2, wherein the nonvolatile register comprises:

a current source;

a first switch, wherein a first terminal of the first switch electrically couples the current source to a register output terminal;

a resistive random access memory element, wherein a first terminal of the resistive random access memory element is electrically coupled with a second terminal of the first switch;

a second switch, wherein a first terminal of the second switch is electrically coupled with a second terminal of the resistive random access memory element;

a first inverter, wherein an output terminal of the first inverter is electrically coupled with control terminals of the first switch and the second switch;

an OR gate, wherein an output terminal of the OR gate is electrically coupled with the output terminal of the first inverter, wherein a first terminal of the OR gate is electrically coupled with a register control terminal, and a second terminal of the OR gate is electrically coupled with a register input terminal;

a third switch, wherein a first terminal of the third switch is electrically coupled with the first terminal of the resistive random access memory element, and the control terminal of the third switch is electrically coupled with the output terminal of the OR gate;

a fourth switch, wherein the first terminal of the fourth switch is electrically coupled with the second terminal of the resistive random access memory element, and the control terminal of the fourth switch is electrically coupled with the output terminal of the OR gate;

a fifth switch, wherein the first terminal of the fifth switch is electrically coupled with a second terminal of the third switch, a second terminal of the fifth switch is configured to receive a power voltage, and a control terminal of the fifth switch is electrically coupled with the register input terminal;

a sixth switch, wherein the first terminal of the sixth switch is electrically coupled with a second terminal of the fourth switch, a second terminal of the sixth switch is configured to receive a reference voltage, and the control terminal of the sixth switch is electrically coupled with the register input terminal;

a seventh switch, wherein a first terminal of the seventh switch is electrically coupled with the second terminal of the third switch, and a second terminal of the seventh switch is configured to receive the reference voltage;

an eighth switch, wherein the first terminal of the eighth switch is electrically coupled with the second terminal of the fourth switch, and a second terminal of the eighth switch is configured to receive the power voltage; and a second inverter, wherein an output terminal of the second inverter is electrically coupled with control terminals of the seventh switch and the eighth switch, and an input terminal of the second inverter is electrically coupled with the register input terminal.

* * * * *